BRIGHTNESS CONTROL CIRCUIT

Filed March 8, 1967

INVENTOR
GEORGE E. ANDERSON
BY Donald N. Timbie
ATTORNEY

United States Patent Office 3,502,807
Patented Mar. 24, 1970

3,502,807
BRIGHTNESS CONTROL CIRCUIT

George E. Anderson, Indianapolis, Ind., assignor to RCA Corporation, a corporation of Delaware Filed Mar. 8, 1967, Ser. No. 621,538
Int. Cl. H04n 5/44
U.S. Cl. 178—7.3 2 Claims

ABSTRACT OF THE DISCLOSURE

The video signal is coupled to a control electrode of a video amplifier via an A.C. path and a parallel D.C. path. Bias voltage is produced by rectifying the A.C. across a portion of a series string of filaments and applied to a potentiometer in the D.C. path.

This invention relates to improvements in brightness control circuits for television receivers.

In television receivers having a D.C. coupled video amplifying system, the brightness of the picture on the cathode ray tube has been controlled by varying the bias voltage applied to one of the video amplifiers. The bias supply voltage has usually been derived from the line deflection system. In some television receivers, and particularly in color television receivers, the derivation of the bias supply voltage in this manner can result in an unstable brightness condition when the receiver is operating under high brightness conditions.

Accordingly, it is an object of this invention to provide an improved brightness control circuit that provides brightness stability under all operating conditions.

It is also desirable that the bias supply voltage be derived in such manner as to tend to maintain constant picture brightness for a range of power line voltage.

A further object of the invention is to provide an improved brightness control for television receivers in which the bias voltage for a maximum brightness setting is approximately the same from receiver to receiver even though low tolerance and therefore inexpensive control potentiometers are used.

It is a further object of this invention to provide an improved brightness control circuit for television receivers that do not have a low voltage power transformer.

These objectives can be attained in accordance with the invention by producing video signals across a load impedance that can conduct direct current, coupling the A.C. components of the video signal from said impedance to a control electrode of a video amplifier or cathode ray tube via one path and coupling the D.C. components of the video signal from said load impedance to the control electrode via a parallel path. In the latter path, one terminal of the resistance of a potentiometer is connected to the load impedance and the tap thereof is connected to the control electrode. A unilateral current conducting device is connected in series with a resistor between a point on a series string of filaments and the potentiometer so as to produce a direct current voltage that is varied by the position of the tap. A.C. ripple is reduced by connecting a capacitor in shunt with the unilateral conducting device and a portion of the series string of filaments.

Figure 1:
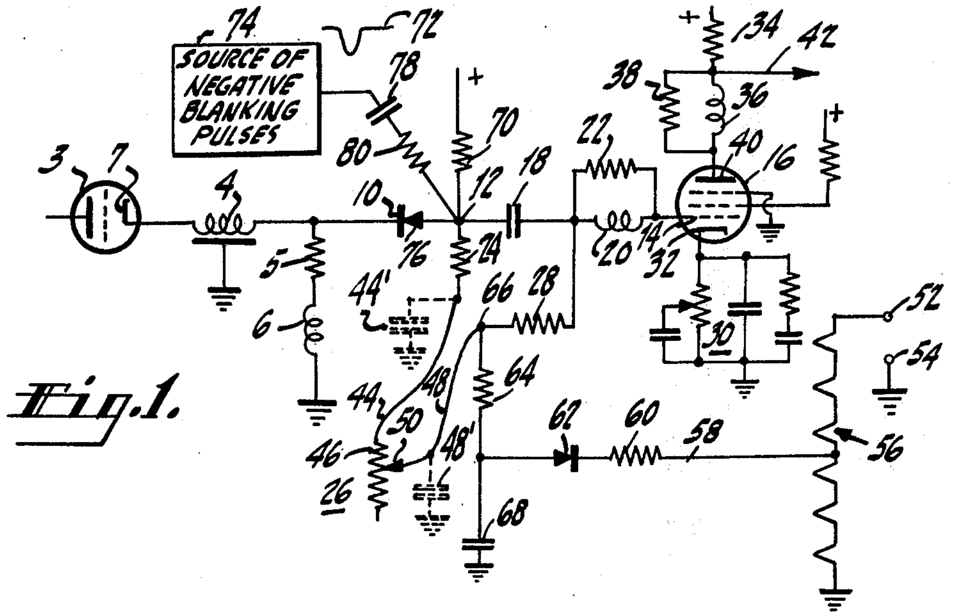
Figure 2:
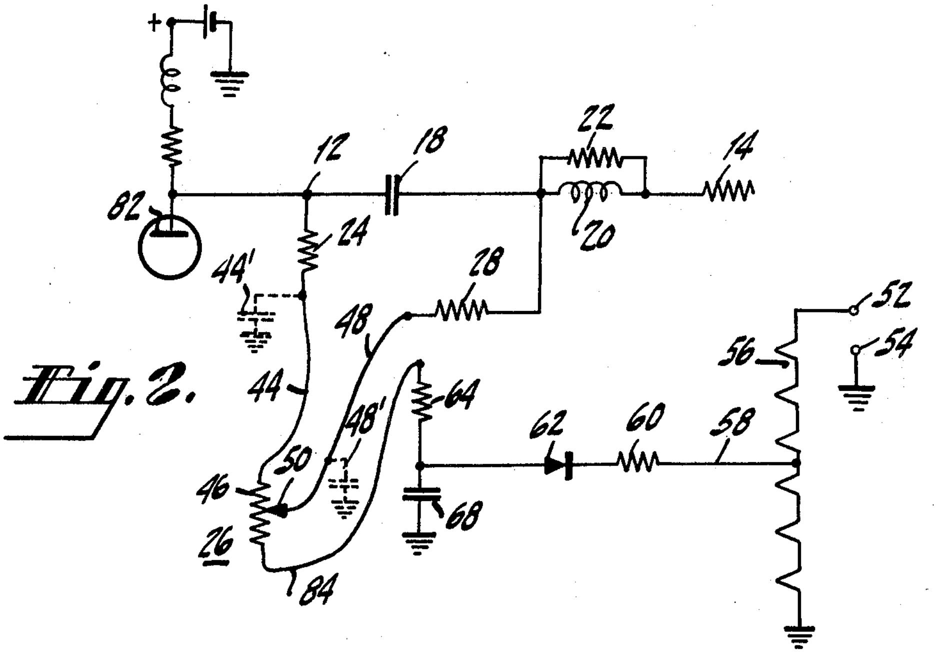

The invention is defined in the claims but the manner in which it operates to achieve the objects noted above will now be explained in greater detail by reference to the drawings in which:

FIGURE 1 is a schematic circuit diagram of a video amplifier including the brightness control of this invention; and FIGURE 2 illustrates an alternative form of a portion of the circuit of FIGURE 1.

Although the invention may be used in a monochrome receiver, it is more likely to be used in a color television receiver, and it will therefore be described in connection therewith. In FIGURE 1, a source of video signals having both alternating and direct current components is shown as being a video amplifier 3 having a delay line 4, a resistor 5 and a peaking coil 6 connected in series between its cathode 7 and ground. The delay line 4 provides the delay required for the luminance signals. The resistor 5 is a terminating impedance for the line 4 and is also a load impedance for the cathode 7. The output of the delay line 4 is connected via a normally conducting blanking diode 10 to a junction 12. The alternating current components of the video signal are coupled from the junction 12 to the grid 14 of a pentode video amplifier 16 via a capacitor 18 and a peaking circuit comprised of an inductor 20 shunted by a resistor 22. The direct current components of the video signals are coupled around the capacitor 18 via a decoupling resistor 24, a brightness control potentiometer 26 and another decoupling resistor 28.

The video amplifier 16 has a contrast control circuit 30 connected to its cathode 32. An output load circuit for the anode 40 of the amplifier 16 is comprised of a load resistor 34 and a peaking coil 36, shunted by a damping resistor 38. The video signals across the load resistor 34 may be coupled to brightness control electrodes of an image forming device, not shown, via a lead 42.

If the potentiometer 26 is to be mounted at a point on the cabinet of the receiver where it will be readily available to the operator, it may be connected to the rest of the circuit via long leads, a lead 44 being connected from one terminal of the resistive element 46 of the potentiometer to the resistor 24, and a lead 48 being connected between the variable tap 50 of the potentiometer 26 and the resistor 28. Because of their length, the leads 44 and 48 may have considerable distributed capacitance to ground which is schematically represented by the dotted capacitors 44', 48' respectively. These capacitors also include any capacitance to ground that is inherent in the potentiometer 26. As the capacitance represented by the dotted capacitors 44' and 48' may be sufficiently large to provide a reactance for the video signal frequencies that is low with respect to the termination impedance 5, 6, the video signal might be severely attenuated unless the decoupling resistor 24 is used. The capacitance represented by the capacitors 44' and 48' also presents a low impedance with respect to the input impedance at the grid 14 so that the video signal might be significantly attenuated if the decoupling resistor 28 were not used.

A bias voltage that can be controlled by the potentiometer 26 is derived in accordance with this invention in the following manner. When the receiver is not provided with a low voltage power line transformer, it is the general practice to connect the filaments in series or series parallel configuration across the power line input. The power line, not shown, may be connected to the input terminals 52, 54 the latter being grounded. A series string of filaments 56 is connected between the terminals 52, 54 and acts as a potential divider so that different voltages may be applied to a lead 58 by connecting it between different ones of the filaments 56. A current limiting protection resistor 60, a diode 62 and a large resistor 64 are connected in series in the order named between the lead 58 and the junction 66 of the lead 48 and the decoupling resistor 28. A filter capacitor 68 is connected between the anode of the diode 62 and ground. The diode 62 rectifies the alternating current voltage thus applied to it from the string of filaments 56 so as to produce a direct current voltage across the capacitor 68. The portion of the voltage that appears at the junction 66, and therefore at the grid 14, is determined by the voltage dividing action of the resistors 64, 46, 24 and 5. The sole function of the resistor 60 is to limit the current through certain of the filaments 56 in the event that the capacitor 68 becomes shorted.

The blanking diode 10 is maintained in a conducting condition during the line scanning intervals by connection of a resistor 70 between the junction 12 and a point of positive potential. In order to prevent video signals from reaching the grid 14 of the video amplifier 16 during the line retrace intervals, negative blanking pulses 72 from a source 74 are applied to the anode 72 of the diode 10 via a capacitor 78 and resistor 80. If blanking were accomplished by some other means, the junction of the resistor 5 and the delay line 4 would be directly connected to the junction 12, but in either case, the junction 12 will generally be at some positive potential.

The resistance of the resistor 64 is sufficiently large to effectively decouple the junction 66 from the junction of the capacitor 68 and diode 62. This prevents any significant attenuation of the direct components of the video signal that might otherwise result by conduction through the diode 62. In addition, the value of the resistor 60 should be large enough in combination with the value of the capacitor 68 to produce a desired reduction in the ripple in the bias voltage. As the resistor 64 is made larger, the negative bias voltage at the junction 66, and hence at the grid 14, is reduced because of the voltage divider action, previously described, of the resistors 64, 46, 24 and 5. Such reduction can be compensated for by connecting the lead 58 to a point of higher voltage on the filaments 56. However, this necessitates higher voltage ratings for the diode 62 and the capacitor 68, thereby making them more costly. On the other hand, as the value of the resistance of the resistor 64 is increased the capacitance of the capacitor 68, and hence its cost, may be reduced without increasing the ripple. The value of the resistance of the resistor 64 can be selected so as to provide adequate decoupling and ripple attenuation and still permit the use of relatively inexpensive components.

Reference is now made to FIGURE 2 for a description of an alternative circuit arrangement in which components corresponding to FIGURE 1 are indicated by the same numerals. It will be noted that in FIGURE 2 the junction 12 is shown as being connected to the anode 82 of a video amplifying stage. The junction 12 may therefore be at a different positive potential than in the circuit of FIGURE 1, but this can be compensated by selection of slightly different value for the resistor 64 and/or the position of the point at which the lead 58 is connected to the heater string 56. Instead of connecting the resistor 64 directly to the junction 66, it is connected via a lead 48 to a point on the resistive element 46 of the potentiometer 26. In either circuit, means are provided for forming a direct circuit path between the resistor 64 and the tap 50. When the tap 50 is set for maximum brightness in the circuit of FIGURE 1, the resistive element 46 of the potentiometer 26 is out of the circuit and hence has no effect. However, in the circuit of FIGURE 2, the resistive element 46 is in the circuit under this condition so that if its value varies from receiver to receiver, the value of the bias potential applied to the grids 14 of the receivers also varies, thus causing one receiver to have a different maximum brightness than another. The problem can be overcome by using potentiometers having a tight tolerance, but the additional cost is considerable.

In television receivers utilizing the circuits of FIGURES 1 or 2, the tendency for variation in the amplitude of the power line voltage to produce a corresponding variation in the brightness of the picture is reduced. An increase in the power line voltage tends to increase the brightness as it increases the anode potential of the cathode ray tube. However, it also increases the alternating current potential supplied to the filament string 56 and therefore increases the bias supplied to the grid 14 of the video amplifier 16. This causes the D.C. voltage at the anode 40 to become more positive and inasmuch as the anode 40 is D.C. coupled to the cathode or cathodes of the cathode ray tube, this increase in positive potential tends to reduce the brightness of the picture.

It will also be noted that because the brightness control voltage is derived from the filament string it is not affected by changes in the operation of the line deflection system.

Although circuit components different than those specified in the following list could be used in accordance with the principles of this invention, it has been found that they perform in a highly satisfactory manner in the circuit of FIGURE 1.

Amplifier 3—½ 5GH8A
Amplifier 16—11HM7
Diode 10—1N60
Diode 62—FD222
Resistor 5—680 ohms
Resistor 24—220K ohms
Resistor 32—250K ohms
Resistor 28—100K ohms
Resistor 46—2.7M ohms
Resistor 42—10K ohms
Resistor 60—390K ohms
Capacitor 18—0.1 μf
Capacitor 48—.047 μf

What is claimed is:

1. In a television receiver employing a plurality of vacuum tube processing circuits, having their filaments connected in a series path between a source of alternating current, which source is subject to amplitude variations that adversely affect the brightness of a video display, the combination comprising apparatus for providing brightness compensation, comprising, (a) a source of video signals, (b) a video amplifier having a control electrode coupled to said source, for amplifying both the A.C. and D.C. components of said video signal to provide at an output electrode thereof an amplified signal wherein said D.C. level of said output electrode is partly determinative of the brightness of said video display, (c) rectifying means coupled across only a portion of said series connected filaments to provide a direct potential which varies in accordance with the variations of said alternating current source, means for applying said direct potential to said electrode whereby said variations are amplified at said output electrode and are of a polarity to cause said D.C. component at said output electrode to compensate for said adverse brightness variations which would otherwise result from said variations in said alternating current supply.

2. In a television receiver of the type employing a video amplifier having a control electrode directly coupled to a source of video signals, including A.C. and D.C. information, said D.C. information determinative of the brightness of video display, said amplifier responsive to both said A.C. and D.C. components for amplifying the same at an output electrode, thereof, said receiver being of the type employing a plurality of vacuum tube devices used in video processing circuitry and having their filaments coupled in series between a source of alternating voltage which is subject to amplitude variations, said amplitude variations adversely causing said processing circuitry to produce changes in the brightness of said video display, apparatus for providing brightness compensation for said video amplifier, comprising, (a) a unidirectional current conducting device having two electrodes, (b) means providing a direct current conduction path between one electrode of said device and a point on said series filament string, said point on said string selected in accordance with said voltage rating of said device, (c) means providing a direct current connection between said other electrode of said device and said control electrode of said video amplifier, to cause a predetermined polarity, rectified A.C. signal to flow through said device.

(d) a filter capacitor connected between a point of reference potential and said other electrode of said device, for responding to said rectified A.C. signal coupled through said unidirectional current device as connected to said filament string, to provide a D.C. voltage including D.C. components due to said variations of said A.C. source and of said predetermined polarity with an amplitude sufficient to vary the D.C. component at said output teminal of said video amplifier in a direction to compensate for said brightness changes.

References Cited

UNITED STATES PATENTS

| | | | |
|---|---|---|---|
| 2,563,740 | 8/1951 | Parker | 315—96 XR |
| 3,328,519 | 6/1967 | Willis | 178—5.4 |

JOHN W. CALDWELL, Primary Examiner

R. L. RICHARDSON, Assistant Examiner

U.S. Cl. X.R.

315—66, 96; 328—258, 270; 330—129